April 28, 1959 — A. F. PIEPER — 2,884,286
PULLEY STRUCTURE
Filed Feb. 15, 1957

INVENTOR.
ALPHONSE F. PIEPER
BY
Harold E. Stonebraker
HIS ATTORNEY

United States Patent Office 2,884,286
Patented Apr. 28, 1959

2,884,286

PULLEY STRUCTURE

Alphonse F. Pieper, Rochester, N.Y.

Application February 15, 1957, Serial No. 640,495

1 Claim. (Cl. 308—190)

This invention relates to a pulley structure with particular reference to pulleys made of refractory material which are capable of excessive frictional wear but readily breakable, and it has for its purpose to mount such a pulley on an anti-friction bearing in such a way that the bearing can be inserted in or removed from the pulley without damaging the latter.

A further purpose of the invention is to so mount the pulley as to hold it securely on the anti-friction bearing against accidental removal, while permitting removal of the pulley easily and without fracture when the bearing must be removed for replacement.

An additional purpose is to so mount the pulley on an anti-friction bearing that a yieldable or plastic ring can be inserted into the pulley by pressure applied against one side of the ring, and the anti-friction bearing similarly driven into the yieldable or plastic ring, while the parts can be separated when necessary to remove and replace a bearing, without in any way fracturing or damaging the pulley.

To these and other ends, the invention consists in the construction and arrangement of parts that will appear clearly from the following description when read in conjunction with the accompanying drawings, the novel features being pointed out in the claims following this specification.

Figure 1:
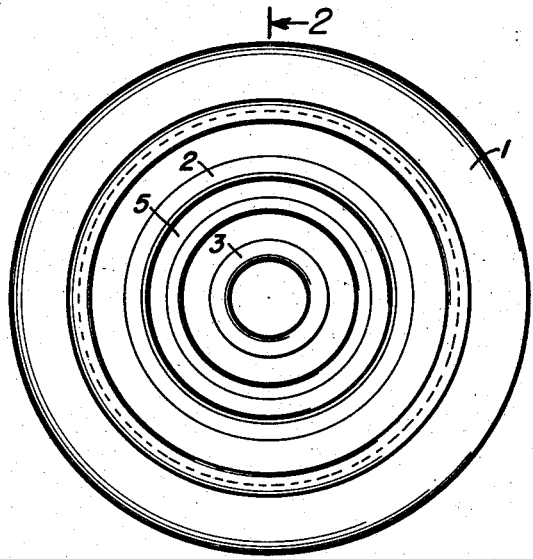
Fig. 1 is a view in side elevation showing a pulley structure constructed in accordance with a preferred embodiment of the invention.
Figure 2:
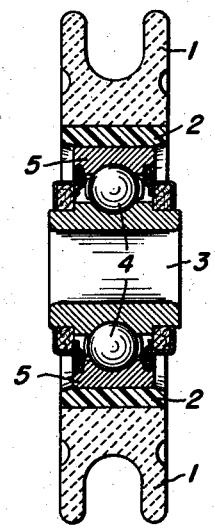
Fig. 2 is a sectional view on line 2—2 of Fig. 1.

Referring more particularly to the drawings in which like reference numerals refer to the same parts throughout the several views, the structure includes a pulley 1 of any suitable refractory material, such as porcelain, Bakelite, or other wear resistant substance, which may be fractured if subjected to excessive pressure or a blow, the pulley having a central opening for mounting on its bearing support.

Within the central opening of the pulley is arranged a yieldable ring or annulus 2, preferably of yieldable material, such as nylon, polyethylene, or other yieldable plastic. The yieldable ring 2 is forced within the surrounding pulley by pressure suitably applied against the side of the ring, and owing to the yieldable character of the ring, this assembly can be effected without fracturing or damaging the refractory pulley.

The pulley is mounted on an anti-friction bearing assembly consisting of an inner bearing ring 3 that is attached to a suitable fixed support or shaft, anti-friction elements 4, and an outer bearing ring 5 which is movable around the inner ring 3 on the anti-friction elements 4.

The anti-friction assembly is mounted within the yieldable ring 2 by pressure applied to the side of the anti-friction unit, and in order to insure proper fit of the parts, the yieldable ring 2 is constructed with an outer diameter that is approximately 5/1000" greater than the diameter of the opening in the pulley, and the inner diameter of the yieldable ring is approximately 5/1000" less than the outer diameter of the outer bearing ring of the anti-friction assembly. Thus the anti-friction assembly is securely held within the yieldable ring, and the pulley is securely held on the yieldable ring, while the parts can be assembled or the anti-friction unit removed for replacement, if worn, without fracturing or damaging the pulley.

Figure 3:
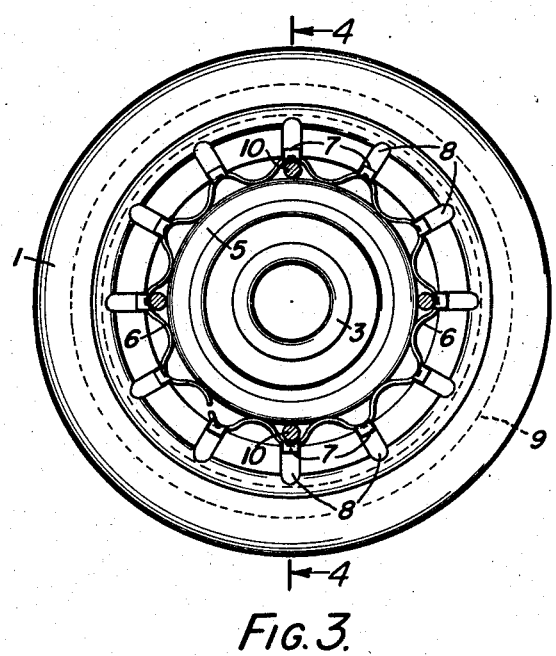
Fig. 3 is a side elevation of a modified form of the invention, partially in section.
Figure 4:
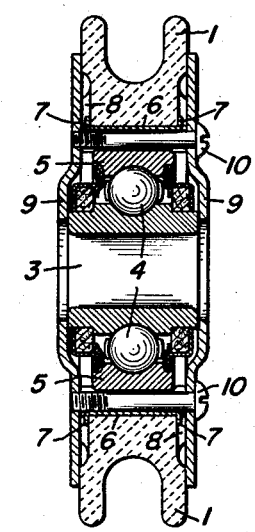
Fig. 4 is a sectional view on line 4—4 of Fig. 3.

In the modification illustrated in Figs. 3 and 4, 6 designates a yieldable element consisting of a corrugated metal strip in the form of a ring located between the pulley 1 and the outer bearing ring 5. The yieldable ring 6 is provided with lugs 7 bent outwardly and engaging slots 8 in the pulley to lock the ring to the pulley and prevent its turning in relation to the pulley. 9 designates dust protecting plates secured to the pulley by bolts 10 which extend through one plate 9, through the space between the bearing ring 5 and the pulley, and are threaded into the other plate 9. The plates 9 include outwardly offset central portions which engage and overlap the outer ends of the inner bearing ring 3.

While the invention has been described with reference to the particular structures herein disclosed, it is not limited to the details set forth herein, and this application is intended to cover such modifications or departures as may come within the purposes of the improvement or the scope of the following claim.

I claim:

The combination with a grooved pulley of refractory fragile porcelain material having a central cylindrical opening, of an anti-friction bearing on which the pulley is mounted, said bearing including inner and outer bearing rings and anti-friction elements located therebetween, said outer bearing ring having a cylindrical outer surface, and a ring of yieldable material selected from the group including nylon and polyethylene and fitting closely between and in contact with said pulley and said outer bearing ring and having cylindrical inner and outer surfaces, said yieldable ring having an outer diameter slightly greater than the diameter of the opening in the pulley and an inner diameter slightly less than the outer diameter of the outer bearing ring, the yieldable ring being positioned within the pulley by movement transversely of the cylindrical surface in the pulley and the anti-friction bearing being positioned in the yieldable ring by movement transversely of the adjacent cylindrical surfaces of the yieldable ring.

References Cited in the file of this patent

UNITED STATES PATENTS

| | | |
|---|---|---|
| 1,691,805 | Haulton | Nov. 13, 1928 |
| 2,198,831 | Moyer | Apr. 30, 1940 |
| 2,199,954 | Kelsey | May 7, 1940 |
| 2,230,744 | Disbro | Feb. 4, 1941 |
| 2,439,269 | Shafer | Apr. 6, 1948 |
| 2,473,267 | Wightman | June 14, 1949 |
| 2,519,927 | Pedu | Aug. 22, 1950 |

FOREIGN PATENTS

| | | |
|---|---|---|
| 637,888 | Great Britain | May 31, 1950 |